(12) United States Patent
Saitoh (10) Patent No.: US 10,893,162 B2
(45) Date of Patent: Jan. 12, 2021

(54) SYSTEM, METHOD OF DETECTING ALTERNATION OF PRINTED MATTER, AND STORAGE MEDIUM

(71) Applicant: Takayuki Saitoh, Kanagawa (JP)

(72) Inventor: Takayuki Saitoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/686,324

(22) Filed: Nov. 18, 2019

(65) Prior Publication Data

US 2020/0177738 A1    Jun. 4, 2020

(30) Foreign Application Priority Data

Nov. 30, 2018 (JP) ................. 2018-224904

(51) Int. Cl.
*H04N 1/00* (2006.01)
*H04N 1/32* (2006.01)

(52) U.S. Cl.
CPC ....... *H04N 1/0088* (2013.01); *H04N 1/00015* (2013.01); *H04N 1/00034* (2013.01); *H04N 1/00037* (2013.01); *H04N 1/00045* (2013.01); *H04N 1/0087* (2013.01); *H04N 1/32267* (2013.01)

(58) Field of Classification Search
CPC ............... H04N 1/0088; H04N 1/0087; H04N 1/00045; H04N 2201/3284; H04N 1/32283
See application file for complete search history.

(56) References Cited

U.S. PATENT DOCUMENTS

| 8,160,295 B2* | 4/2012 | Sakai | ................. H04N 1/32203 382/100 |
| 8,270,033 B2* | 9/2012 | Asano | ................ H04N 1/32208 358/3.26 |
| 2005/0264851 A1 | 12/2005 | Hara | |
| 2011/0170133 A1* | 7/2011 | Kurilin | .............. H04N 1/32229 358/1.15 |

(Continued)

FOREIGN PATENT DOCUMENTS

| JP | 2005-341493 | 12/2005 |
| JP | 2010-093632 | 4/2010 |
| JP | 2011-124787 | 6/2011 |

*Primary Examiner* — King Y Poon
*Assistant Examiner* — Michael Burleson
(74) *Attorney, Agent, or Firm* — Oblon, McClelland, Maier & Neustadt, L.L.P.

(57) ABSTRACT

A system includes circuitry configured to embed a digital watermark data in an original image, wherein the original image is divided into a plurality of blocks each block having been embedded with a pattern corresponding to each value of the digital watermark data, store, in a memory, the original image, the digital watermark data embedded in the original image, and an embedding position of the pattern of the digital watermark data in association, detect a pattern in a scanned image of a printed matter, decode the detected pattern to acquire digital watermark data included in the scanned image, align each block between the original image and the scanned image, based on the embedding position of the pattern associated with the original image and a detection position of the pattern detected from the scanned image, and obtain a difference between the original image and the scanned image aligned with each other.

6 Claims, 7 Drawing Sheets

(56) References Cited

U.S. PATENT DOCUMENTS

2014/0080511 A1 3/2014 Saitoh
2015/0070714 A1 3/2015 Sadasue et al.
2015/0071493 A1 3/2015 Kajiwara et al.
2018/0077309 A1 3/2018 Saitoh

* cited by examiner

FIG. 3B (WHEN SCANNING)

PATTERN OF [0]

| 0 | 0 | 0 |
|---|---|---|
| 0 | 1 | 0 |
| 0 | 0 | 0 |
| 0 | 0 | 0 |
| 0 | 0 | 0 |
| 0 | 0 | 0 |
| 0 | 0 | 0 |
| 0 | 0 | 0 |
| 0 | 1 | 0 |
| 0 | 0 | 0 |

FIG. 5B

PATTERN OF [1]

| 0 | 0 | 0 | 0 | 0 | 0 | 0 | 0 | 0 | 0 |
|---|---|---|---|---|---|---|---|---|---|
| 0 | 1 | 0 | 0 | 0 | 0 | 0 | 0 | 1 | 0 |
| 0 | 0 | 0 | 0 | 0 | 0 | 0 | 0 | 0 | 0 |

FIG. 6

SYSTEM, METHOD OF DETECTING ALTERNATION OF PRINTED MATTER, AND STORAGE MEDIUM

CROSS-REFERENCE TO RELATED APPLICATION

This application claims priority pursuant to 35 U.S.C. § 119(a) to Japanese Patent Application No. 2018-224904, filed on Nov. 30, 2018 in the Japan Patent Office, the disclosure of which is incorporated by reference herein in its entirety.

BACKGROUND

Technical Field

This disclosure relates to a system, a method of detecting an alternation of a printed matter, and a non-transitory computer readable storage medium.

Background Art

Technologies for preventing unauthorized leakage or alteration of printed matter have been developed, in which digital watermark data is embedded in printed materials and printed. The digital watermark technologies include a technique, in which an image is divided into a plurality of regions, and digital watermark data is embedded in each region.

For example, one technology discloses a configuration including a unit region setting means and a unit region conversion means, in which unit region setting means sets a plurality of unit regions, respectively corresponding to element values of binary information, and the unit region conversion means converts pixel values of each unit region of the plurality of unit regions using the element values corresponding to the respective unit regions to embed the binary information into the original image. This technology can generate an image embed with information capable of suppressing deterioration of information by printing or the like, can read the binary information with higher accuracy from the image embed with information.

SUMMARY

As one aspect of the present disclosure, a system is devised. The system includes circuitry configured to embed a digital watermark data in an original image, wherein the original image is divided into a plurality of blocks each block having been embedded with a pattern corresponding to each value of the digital watermark data, store, in a memory, the original image, the digital watermark data embedded in the original image, and an embedding position of the pattern of the digital watermark data in association with each other, detect a pattern in a scanned image of a printed matter, decode the detected pattern to acquire digital watermark data included in the scanned image, align each block between the original image and the scanned image, based on the embedding position of the pattern associated with the original image and a detection position of the pattern detected from the scanned image, and obtain a difference between the original image and the scanned image aligned with each other to detect an alteration of the printed matter.

As another aspect of the present disclosure, a method of detecting an alteration of a printed matter, printed from an original image is devised. The method includes embedding a digital watermark data in the original image, wherein the original image is divided into a plurality of blocks each block having been embedded with a pattern corresponding to each value of the digital watermark data, storing, in a memory, the original image, the digital watermark data embedded in the original image, and an embedding position of the pattern of the digital watermark data in association with each other, detecting a pattern in a scanned image of the printed matter, decoding the detected pattern to acquire digital watermark data included in the scanned image, aligning each block between the original image and the scanned image, based on the embedding position of the pattern associated with the original image and a detection position of the pattern detected from the scanned image, and obtaining a difference between the original image and the scanned image aligned with each other to detect an alteration of the printed matter.

As another aspect of the present disclosure, a non-transitory computer readable storage medium storing one or more instructions that, when executed by one or more processors, cause the one or more processors to perform a method of detecting an alteration of a printed matter, printed from an original image is devised. The method includes embedding a digital watermark data in the original image, wherein the original image is divided into a plurality of blocks each block having been embedded with a pattern corresponding to each value of the digital watermark data, storing, in a memory, the original image, the digital watermark data embedded in the original image, and an embedding position of the pattern of the digital watermark data in association with each other, detecting a pattern in a scanned image of the printed matter, decoding the detected pattern to acquire digital watermark data included in the scanned image, aligning each block between the original image and the scanned image, based on the embedding position of the pattern associated with the original image and a detection position of the pattern detected from the scanned image, and obtaining a difference between the original image and the scanned image aligned with each other to detect an alteration of the printed matter.

BRIEF DESCRIPTION OF THE DRAWINGS

A more complete appreciation of the description and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another element, component, region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a disclosure is given of an embodiment of this disclosure, but the present disclosure is not limited to the embodiment described below. In each of the following drawings, the same reference numerals are used for common elements, and the description thereof will be omitted.

Figure 1:
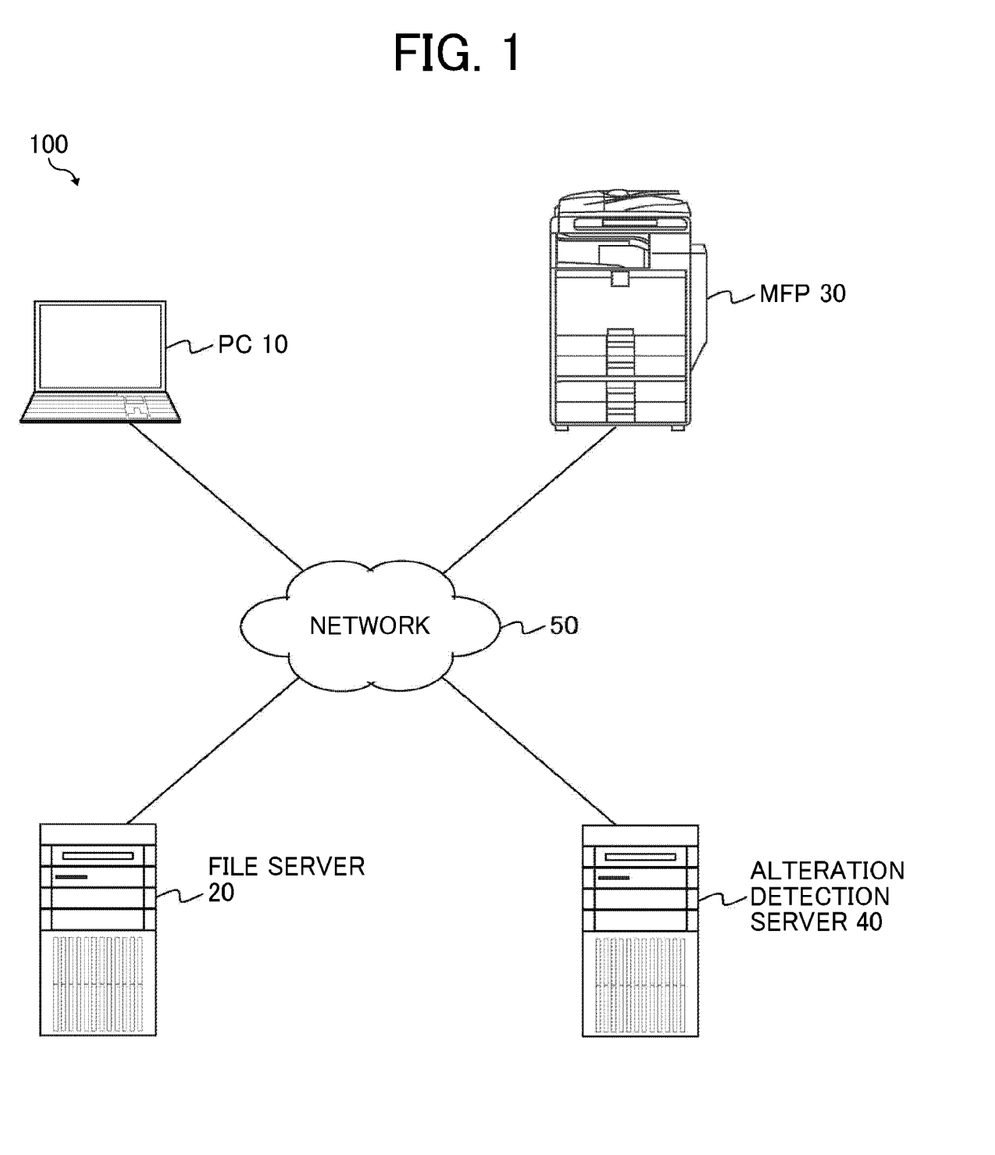
FIG. 1 is an example system configuration of a system according to an embodiment of the present disclosure.

FIG. 1 is an example system configuration of a system 100 according to an embodiment of the present disclosure. As illustrated in FIG. 1, the system 100 includes, for example, a personal computer (PC) 10, a file server 20, a multi-function peripheral (MFP) 30, and an alteration detection server 40, and each device or apparatus is connected via a network 50 to communicate with each other.

The PC 10 is an example of an information processing apparatus that instructs the MFP 30 to output of a print of document file stored in a local storage (memory). The file server 20 is an example of an information processing apparatus having a storage that synchronizes with the local storage (memory) of the PC 10, with which a change to the document file stored at the PC 10 is reflected to the corresponding document file stored at the file server 20.

The MFP 30 is an example of an image forming apparatus, such as a multifunction apparatus equipped with a printer function and a scanner function. The alteration detection server 40 is an example of an information processing apparatus that detects an alteration part or portion from a printed matter scanned by a scanner used by a user.

The system configuration of the system 100 according to the embodiment has been described above. Hereinafter, a functional configuration of each device or apparatus configuring the system 100 is described with reference to FIG. 2.

Figure 2:
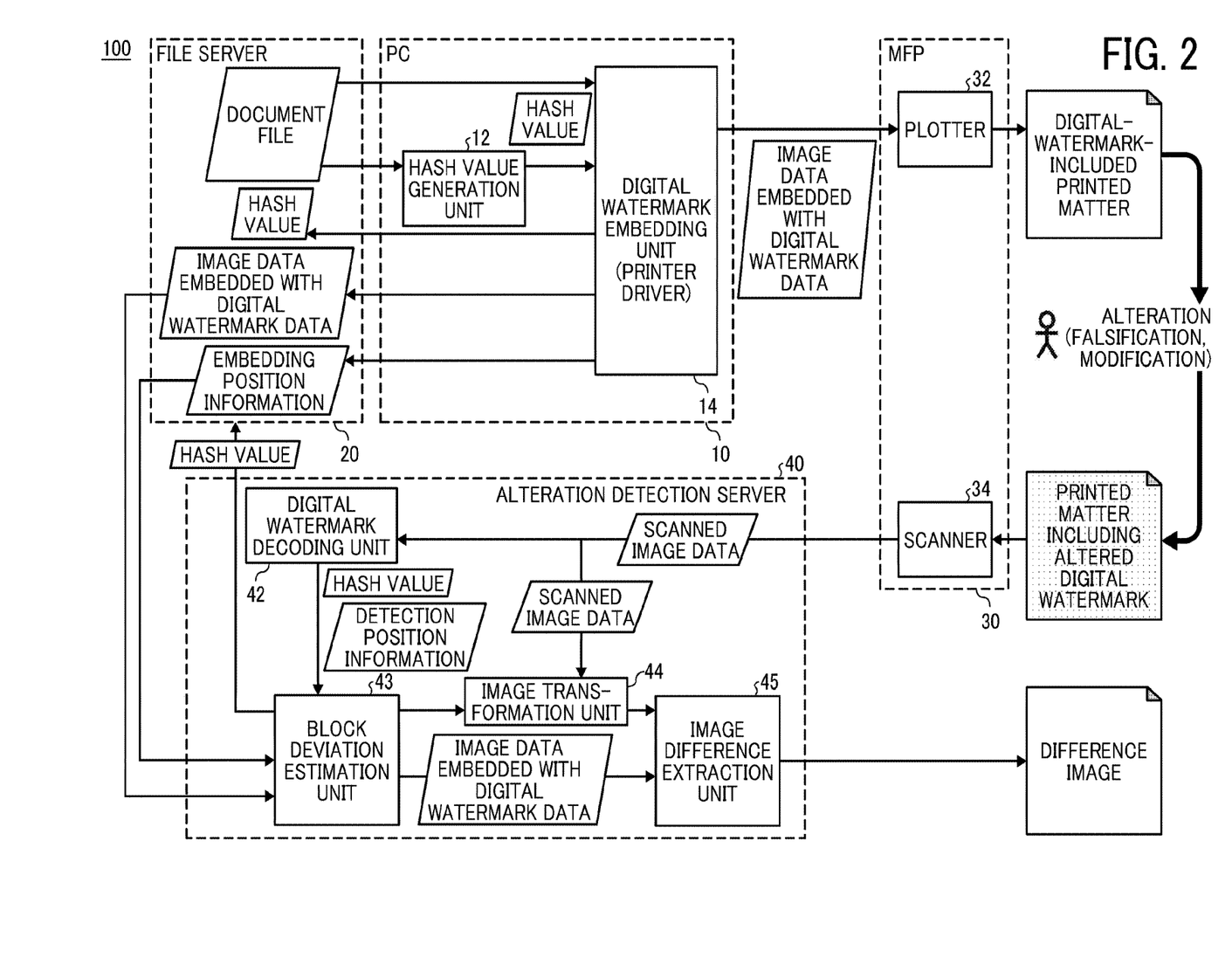
FIG. 2 is an example functional configuration of the system according to the embodiment of the present disclosure.

As illustrated in FIG. 2, the PC 10 includes, for example, a hash value generation unit 12 and a digital watermark embedding unit 14.

The hash value generation unit 12 generates a hash value based on a document file acquired from the file server 20, and transfers the generated hash value to the digital watermark embedding unit 14.

The digital watermark embedding unit 14 generates print data to be transmitted to the MFP 30, in which the digital watermark embedding unit 14 can be construed as a printer driver. For example, the digital watermark embedding unit 14 generates original or source image data from the document file and embeds the hash value received from the hash value generation unit 12 into the generated original image data as digital watermark data.

Specifically, the digital watermark embedding unit 14 divides the original image data into a plurality of regions, embeds a pattern representing the digital watermark data to each region based on a given rule by assigning the digital watermark data to each region, and then converts the image data embedded with the digital watermark data into, for example, print data represented by cyan, magenta, yellow, and black (CMYK) colors. In the following description, print data of image data, which is generated from the original image data by embedding the digital watermark data, may be simply referred to as the digital-watermarked image data.

The digital watermark embedding unit 14 transmits the generated digital-watermarked image data to the MFP 30. At this stage, the digital watermark embedding unit 14 associates a copy of the digital-watermarked image data, an embedding position information indicating a position where the digital watermark is embedded, and the hash value received from the hash value generation unit 12, and then transmits the associated data to the file server 20. That is, the digital watermark embedding unit 14 transmits the digital-watermarked image data and the embedding position information to the file server 20 by setting the generated hash value as an access key.

The file server 20 registers three pieces of information received from the PC 10 (i.e., hash value, digital-watermarked image data, embedding position information) and registers the three pieces of information in association with each other. In response to receiving an inquiry setting the hash value as the access key, the file server 20 returns the digital-watermarked image data and the embedding position information associated with the hash value.

As illustrated in FIG. 2, the MFP 30 includes, for example, a plotter 32 and a scanner 34. When the MFP 30 receives the digital-watermarked image data from the PC 10, the plotter 32 prints out a printed matter including a digital watermark pattern (hereinafter, digital-watermark-included printed matter). On the other hand, the scanner 34 generates scanned image data of the printed matter, which is suspected to be altered, in response to a request from a user. At this stage, the MFP 30 transfers the generated scanned image data to the alteration detection server 40.

As illustrated in FIG. 2, the alteration detection server 40 includes, for example, a digital watermark decoding unit 42, a block deviation estimation unit 43, an image transformation unit 44, and an image difference extraction unit 45.

The digital watermark decoding unit 42 detects the digital watermark embedded in the scanned image data received from the MFP 30, and decodes the detected digital watermark to obtain or acquire a hash value. Then, the digital watermark decoding unit 42 transfers the acquired hash value and information indicating a detection position of the detected digital watermark to the block deviation estimation unit 43. In the following description, information indicating the detection position of the digital watermark is simply referred to as the detection position information.

The block deviation estimation unit 43 sends an inquiry to the file server 20 using the hash value acquired from the digital watermark decoding unit 42 as a key to obtain the digital-watermarked image data and the embedding position information associated with the hash value from the file server 20, and then compares the acquired embedding position information and the detection position information received from the digital watermark decoding unit 42 to estimate a positional deviation amount of each block. Then, the block deviation estimation unit 43 transfers the digital-watermarked image data acquired from the file server 20 to the image difference extraction unit 45, and transfers a result of the positional deviation amount of each block to the image transformation unit 44.

The image transformation unit 44 transforms the scanned image data based on the positional deviation amount of each block received from the block deviation estimation unit 43 to generate corrected image data by aligning positions of each block with the original image data. Then, the image transformation unit 44 transfers the generated corrected image data (corrected scanned image data) to the image difference extraction unit 45.

The image difference extraction unit 45 compares the corrected image data received from the image transformation unit 44 and the digital-watermarked image data received from the block deviation estimation unit 43 to extract a difference between the compared two image data, and outputs a difference of the compared two image data as difference result, such as a difference image.

Each of the apparatuses configuring the system 100 has been described above. Hereinafter, a description is given of a process performed by the system 100 based on a data flow diagram illustrated in FIGS. 3A and 3B (FIG. 3).

Figure 3A:
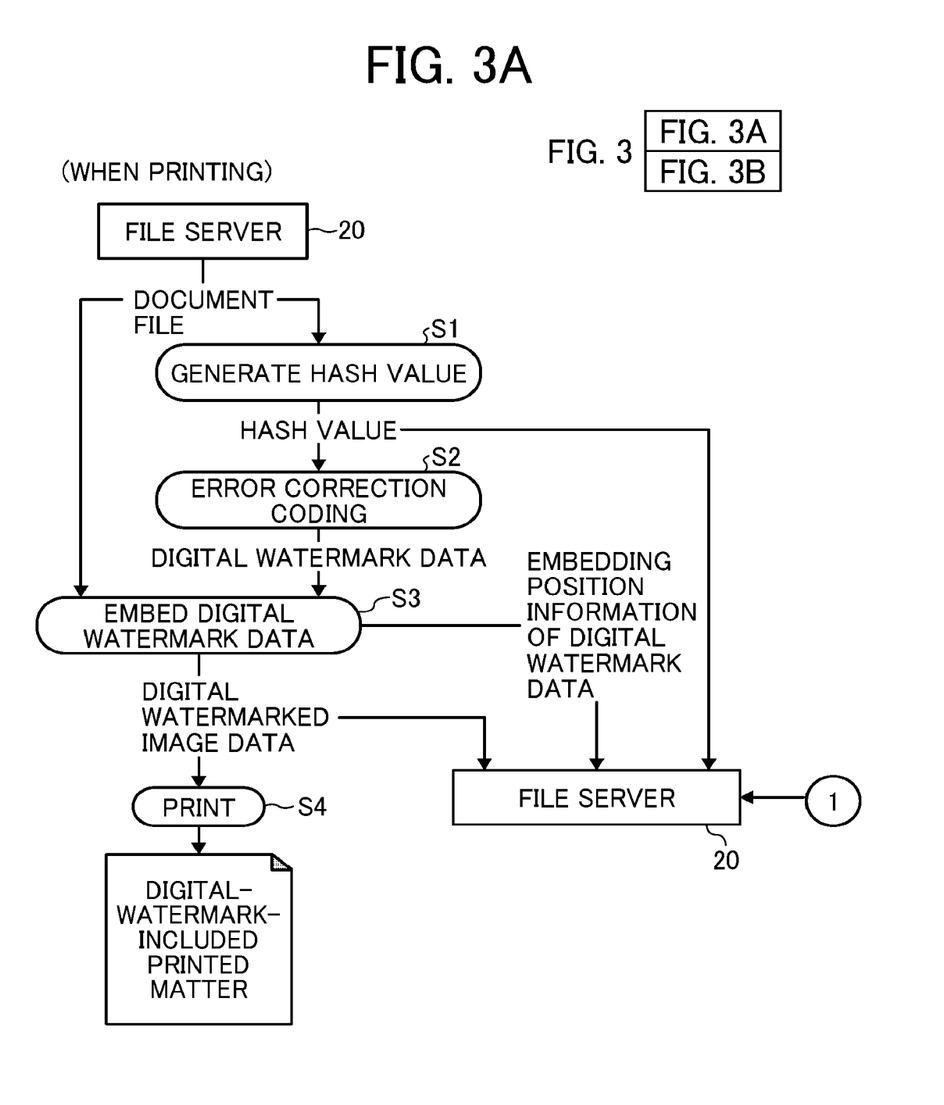
FIGS. 3A and 3B (FIG. 3) are an example of a data flow diagram of a process performed by the system according to the embodiment of the present disclosure.
Figure 3B:
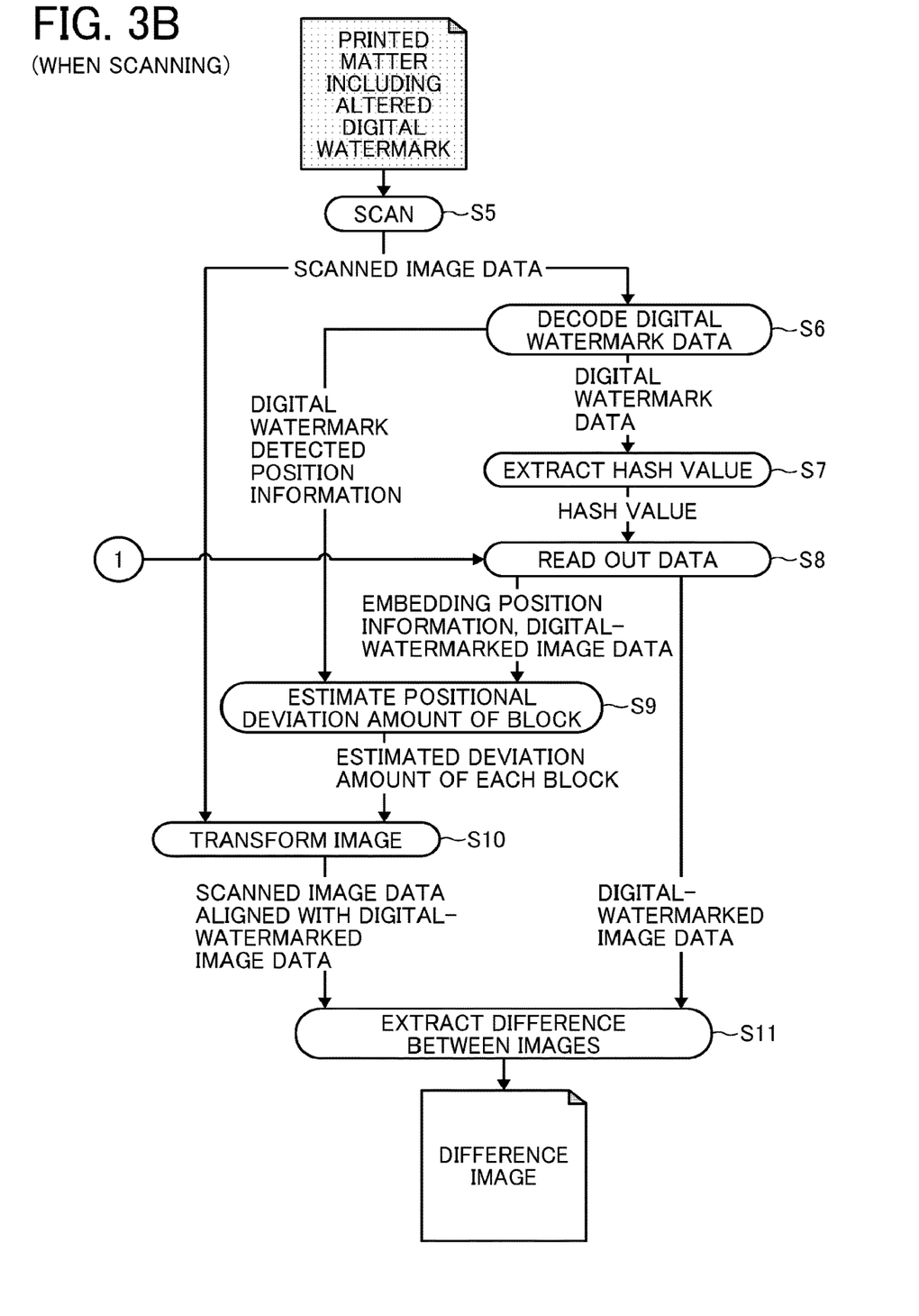

First, the processing executed during a printing operation is described based on the data flow diagram illustrated in FIG. 3A.

A user configures the settings for embedding a digital watermark in a document file stored in the local storage (memory) of the PC 10, and then instructs the PC 10 to print the document file. In response to this instruction, the hash value generation unit 12 of the PC 10 generates a hash value based on the document file (step S1).

To ensure the robustness of data, the digital watermark embedding unit 14 applies error correction coding processing (e.g., Reed-Solomon coding) to the hash value generated by the hash value generation unit 12 to set the hash value having redundancy (step S2).

Then, the digital watermark embedding unit 14 generates original or source image data from the document file acquired from the file server 20, and embeds the hash value (more specifically, the hash value consisting of code string having redundancy) into the original image data to generate digital-watermarked image data (step S3).

Hereinafter, the embedding process of digital watermark data performed in step S3 is described in detail with reference to FIG. 4.

At first, the original image data is divided into a plurality of blocks. FIG. 4 is a schematic diagram illustrating the original image data divided into a plurality of blocks. In an example case of FIG. 4, the original image data is divided into "a×b" blocks, corresponding to "N×M" pixels. In the embodiment, since one bit of data is embedded in each block, data amount corresponding to "a×b" blocks can be embedded as the maximum data amount.

Figure 4:
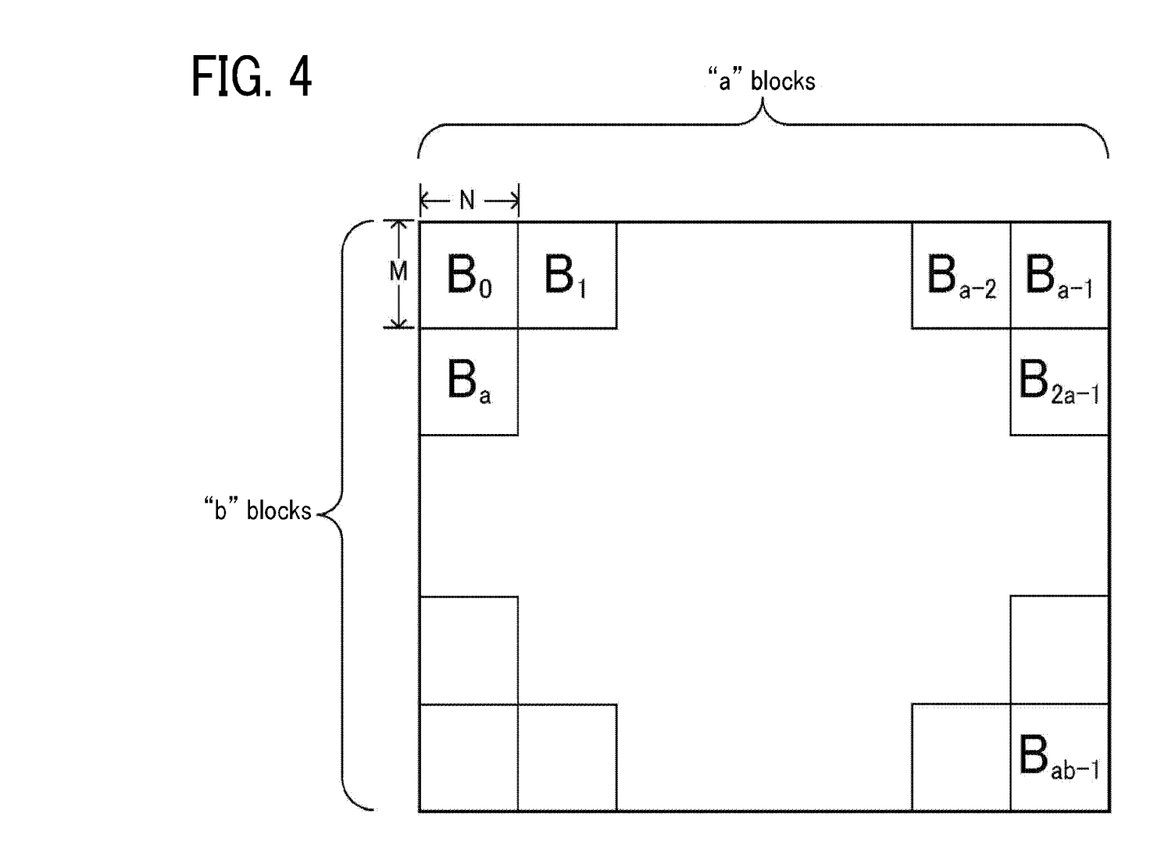
FIG. 4 is a schematic diagram illustrating original image data divided into a plurality of blocks.

Then, block numbers of "0, 1, . . . ab−1" are allocated to each block sequentially from the upper left to the lower right of the original image data as illustrated in FIG. 4. Then, a pattern corresponding to respective values of binary code string constituting the digital watermark data (i.e., a pattern representing a value of "0" or a pattern representing a value of "1") is embedded from the first block sequentially.

Figure 5A:
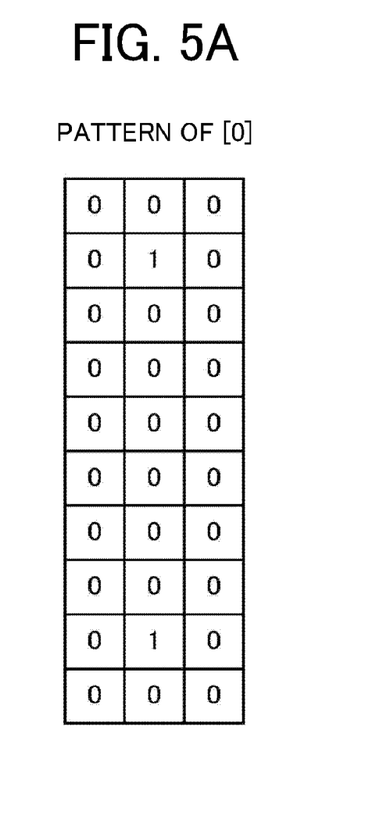
FIGS. 5A and 5B illustrate examples of patterns embedded in each block as the digital watermark.
Figure 5B:
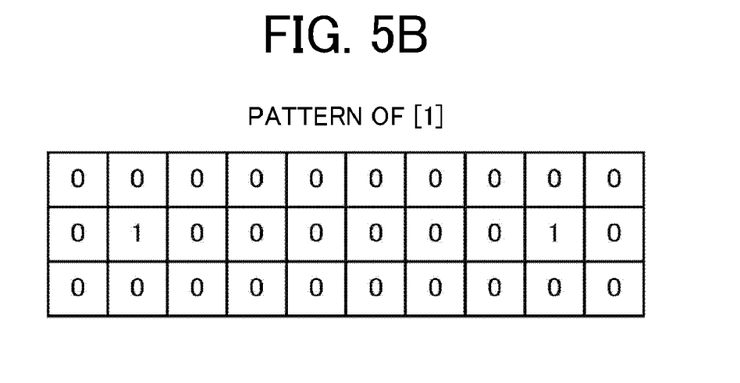

FIGS. 5A and 5B illustrate examples of patterns embedded in each block as the digital watermark. FIG. 5A indicates a pattern representing the value of "0," and FIG. 5B indicates a pattern representing the value of "1." The pattern illustrated in FIG. 5A and FIG. 5B indicates the pattern that can be matched in a reduced-size image, generated by reducing a size of the scanned image, to be described later. The actual image is embedded with the pattern before reducing the size.

The pattern can be embedded using any known method, such as a method of replacing pixels constituting a pattern, among pixels constituting the original image data, with the pixels of the maximum luminance value or the minimum luminance value, and a method of setting a difference between pixel values of pixels constituting a pattern and pixel values of the surrounding pixels.

Referring again to FIG. 3, the description is continued.

After step S3, the digital watermark embedding unit 14 associates a copy of the digital-watermarked image data generated in step S3, the embedding position information of the digital watermark, and the hash value generated in step S1 to register the digital-watermarked image data, the embedding position information of the digital watermark, and the hash value in the file server 20.

The embedding position information of the digital watermark registered in the file server 20 includes embedding position information for each block. The embedding position information for each block consists of a block number, pattern embedded-or-not information indicating whether or not a pattern is embedded, a value (i.e., 0 or 1) of the code assigned to the block, and a pattern embedded position where the pattern is embedded. In this description, the term of "pattern embedded position" means coordinates of the embedding position of dot pattern (see FIG. 5) on the image coordinate system of the digital-watermarked image data. Further, the term of "pattern embedded-or-not information" means information indicating a state whether a pattern can be embedded in the block because a pattern cannot be embedded in the block when the block includes some image content that cannot be embedded with the pattern.

Then, the digital watermark embedding unit 14 transmits the digital-watermarked image data generated in step S3 to the MFP 30. In response to receiving the digital-watermarked image data, the MFP 30 prints out digital-watermark-included printed matter (step S4).

In another case, after the original image data is converted to the print data, the digital watermark data is embedded into the print data.

The processing performed at the time of printing is described as above. Hereinafter, a description is given of the processing that is performed when the printed matter, which is suspected to be altered (or a subject to be detected for alteration), is scanned with reference to the data flow diagram illustrated in FIG. 3B.

The user sets the printed matter, which is suspected to be altered, onto a document table of the MFP 30 and instructs the scanning. In response to this scanning instruction, the scanner 34 of the MFP 30 scans the printed matter to generate scanned image data (step S5). The MFP 30 that scans the printed matter, which is suspected to be altered, does not necessarily need to be the same MFP 30 that has printed the printed matter, but may be another device or apparatus, which is different from a printing apparatus that has printed the printed matter.

In response to generating the scanned image data, the digital watermark decoding unit 42 detects a digital watermark pattern embedded in the generated scanned image data, and decodes the detected digital watermark pattern to acquire digital watermark data (step S6). At this stage, the digital watermark decoding unit 42 transfers information of the pattern detected position where the pattern is detected for each block to the block deviation estimation unit 43 as the detection position information. The term of "pattern detected position" means coordinates of the detection position of dot pattern on the image coordinate system of the scanned image data.

Then, the digital watermark decoding unit 42 extracts a hash value from the digital watermark data acquired in step S6 using a given decoding method corresponding to the error correction coding method used in step S2 (step S7).

In response to extracting the hash value (step S7), the block deviation estimation unit 43 inquires the file server 20 using the hash value extracted in step S7 as an access key to read out the digital-watermarked image data and the embedding position information associated with the hash value from the file server 20 (step S8).

Then, the block deviation estimation unit 43 estimates a positional deviation amount of the digital-watermarked image data and the scanned image data for each block (step S9). Since color expression of the two images may be different, conversion processing such as required color conversion is performed in advance. Then, the block deviation estimation unit 43 performs a position estimation at higher resolution using the following procedure based on the embedding position information acquired from the file server 20 and the detection position information received from the digital watermark decoding unit 42 (step S9).

First, a block of the digital-watermarked image data embedded with the pattern and a corresponding block of the scanned image data in which the pattern has been detected are searched by setting a pattern detection point as the center for each sub-block, and then the alignment of position of two image data are performed for a block unit. In a case of a concerned block of the scanned image data where the pattern is not detected, the searching is performed by setting the pattern embedding position, estimated from the pattern detection point of the surrounding blocks of the concerned block, as the center.

Then, the image transformation unit 44 compensates each pixel of the scanned image data acquired in step S5 by applying an appropriate pixel compensation method (e.g., nearest neighbor method, bilinear method, bicubic method) based on the positional deviation amount of the block estimated in step S9 so that each pixel consisting the scanned image data is associated with each pixel consisting the digital-watermarked image data with one to one. Then, the scanned image data that is aligned with the digital-watermarked image data for each position is acquired (step S10).

After step S10, the image difference extraction unit 45 compares the scanned image data, aligned with the digital-watermarked image data for each of corresponding positions, and the digital-watermarked image data read in step S8, extracts a difference between the compared two image data, and outputs an extraction result in any given form (step S11). For example, when the extraction result is output as a difference image, a part or portion that is altered on the printed matter including the digital watermark (e.g., alteration, handwriting characters, etc.) can be recognized from the difference image, As to the above described embodiment, the digital watermark pattern having redundancy is embedded, and the digital watermark pattern having redundancy is used as a feature point to align the digital-watermarked image data and the scanned image data for corresponding positions. Therefore, compared to conventional method that performs the matching after extracting feature points by conducting an enormous amount of computation, in the above described embodiment, the highly reliable matching can be performed with less calculation workload, and thereby, the alteration made to the printed matter can be detected in a shorter time and with higher accuracy.

The present disclosure has been described with reference to the above embodiment, but the present disclosure is not limited to the embodiment described above.

For example, in another configuration of the embodiment (modified configuration 1), when embedding the digital watermark, in addition to the embedding position information of each block, the feature value of each block (e.g., the number of white pixels) can be also registered in the file server 20. In this configuration, the registered feature value of each block can be used in addition to the embedding position of the pattern during the matching, thereby the calculation workload of the matching can be further reduced.

Further, in another configuration of the embodiment (modified configuration 2), when estimating the positional deviation amount of block, the positional deviation amount estimated for blocks surrounding the target block can be used as a weight for estimating the positional deviation amount of the target block. Further, in this another configuration (modified configuration 2), the weighting of the surrounding blocks can be increased when the matching is performed for the block that is decoded with an erroneous value for the pattern.

Further, in another configuration of the embodiment (modified configuration 3), after decoding the digital watermark data, the coding, which was performed when the digital watermark was embedded in the image initially, can be performed again to acquire data embedded in each block, and then the embedding position of the digital watermark of each block can be detected.

Further, the algorithm (i.e., the pattern illustrated in FIG. 5, the rule to assign codes to the block, the rule to read codes, etc.) described in the above described embodiment is just one example, and other appropriate algorithms with robustness in which the decoding of the pattern is hardly impaired may be adopted.

Figure 6:
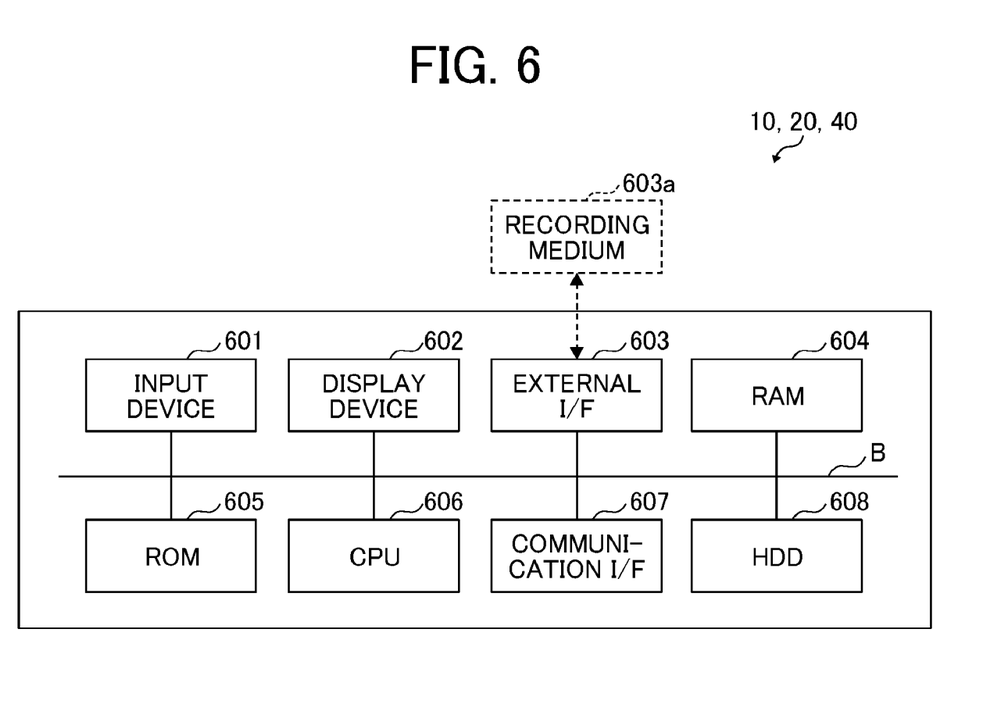
FIG. 6 is an example of a hardware block diagram of a computer system.

Hereinafter, a hardware configuration of the PC 10, the file server 20 and the alteration detection server 40 is described with reference to FIG. 6. FIG. 6 is an example of a hardware block diagram of a computer system according to the present disclosure, which can be employed for the PC 10, the file server 20 and the alteration detection server 40.

As illustrated in FIG. 6, the computer system includes, for example, an input device 601, a display device 602, an external interface (I/F) 603, a random access memory (RAM) 604, a read only memory (ROM) 605, a central processing unit (CPU) 606, a communication I/F 607, and a hard disk drive (HDD) 608 connected to one another by a bus B.

The input device 601 includes, for example, a keyboard, a mouse, a touch panel and the like, and the user uses the input device 601 to input each operation signal. The display device 602 includes, for example, a display to display processing results processed by the computer system.

The communication I/F 607 is an interface for connecting the computer system to an internal network and the Internet, or the like. With this configuration, the computer system can communicate with other system or apparatus via the communication I/F 607.

The HDD 608 is a nonvolatile storage device that stores programs and data. The stored programs and data include operating system (OS), which is the basic software that controls the computer system entirely, and application software programs, which provide various functions on the operating system. The HDD 608 stores programs and data using a given file system and/or database (DB).

The external I/F 603 is an interface with an external device. The external device includes, for example, a recording medium 603a or the like. With this configuration, the computer system can read and write information on the recording medium 603a via the external I/F 603. The recording medium 603a includes, for example, a flexible disk, compact disc (CD), digital versatile disk (DVD), secure digital (SD) memory card, universal serial bus (USB) memory card, and the like.

The ROM 605 is a non-volatile semiconductor memory (storage device) capable of retaining programs and data even when the power supply is turned off. The ROM 605 stores programs and data such as basic input/output system (BIOS), OS settings, and network settings to executed at the time of activating the computer system. The RAM 604 is a volatile semiconductor memory (storage device) that temporarily retains the program and the data.

The CPU 606 is a computing device that reads programs and data from a storage device such as the ROM 605 and the HDD 608 onto the RAM 604 and implements the controlling and functions of the computer system entirely.

Further, some of the components indicated in FIG. 6 can be omitted depending on the type of information processing apparatus. For example, the input device 601 and the display device 602 can be omitted from the file server 20 and the alteration detection server 40. Further, the computer system indicated in FIG. 6 can be used as a control unit of the MFP 30.

Further, the respective functional units illustrated in FIG. 2 can be changed by the integration or dispersion, as needed, unless there is any problem in the execution of the above-described processing. Specifically, the function of the alteration detection server 40 may be integrated into the file server 20, the function of the alteration detection server 40 may be integrated into the MFP 30, the function of the file server 20 may be integrated into the MFP 30, and the function of the alteration detection server 40 and the function of the file server 20 may be integrated into the PC 10.

Conventionally, since the feature value on image is extracted and the compared with the original image, the calculation workload becomes greater, causing a longer time for data processing, and thereby a longer time is required for detecting the alteration of printed matter, which is not suitable for the installed application.

As to the above described embodiment of the present disclosure, the system, image forming apparatus, and method can detect alteration of printed matter with less time and higher accuracy.

In addition, the present disclosure is included within the scope of the present disclosure, insofar as the effects and effects of the present disclosure are provided within the range of embodiments to be considered by a person skilled in the art.

The functions of the embodiment of the present disclosure can be implemented by executing programs described in one or more appropriate program languages on one or more computers, and the program of the embodiment can be stored and distributed on any recording medium, and can be transmitted over the network.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. A system comprising:
  circuitry configured to
  embed a digital watermark data in an original image, wherein the original image is divided into a plurality of blocks each block having been embedded with a pattern corresponding to each value of the digital watermark data;
  store, in a memory, the original image, the digital watermark data embedded in the original image, and an embedding position of the pattern of the digital watermark data in association with each other;
  detect a pattern in a scanned image of a printed matter;
  decode the detected pattern to acquire digital watermark data included in the scanned image;
  align each block between the original image and the scanned image, based on the embedding position of the pattern associated with the original image and a detection position of the pattern detected from the scanned image; and
  obtain a difference between the original image and the scanned image aligned with each other to detect an alteration of the printed matter.

2. The system according to claim 1,
  wherein the memory stores a feature value of the each block of the original image, and the circuitry aligns a position of the each block using the feature value of the each block.

3. The system according to claim 1,
  wherein the circuitry estimates a positional deviation amount of a target block using a positional deviation amount of one or more blocks surrounding the target block as a weight.

4. The system according to of claim 3,
  wherein the circuitry increases the weight of the one or more blocks surrounding the target block when an erroneous value is decoded from a pattern of the target block.

5. A method of detecting an alteration of a printed matter, printed from an original image, the method comprising:

embedding a digital watermark data in the original image, wherein the original image is divided into a plurality of blocks each block having been embedded with a pattern corresponding to each value of the digital watermark data;

storing, in a memory, the original image, the digital watermark data embedded in the original image, and an embedding position of the pattern of the digital watermark data in association with each other;

detecting a pattern in a scanned image of the printed matter;

decoding the detected pattern to acquire digital watermark data included in the scanned image;

aligning each block between the original image and the scanned image, based on the embedding position of the pattern associated with the original image and a detection position of the pattern detected from the scanned image; and obtaining a difference between the original image and the scanned image aligned with each other to detect an alteration of the printed matter.

6. A non-transitory computer readable storage medium storing one or more instructions that, when executed by one or more processors, cause the one or more processors to perform a method of detecting an alteration of a printed matter, printed from an original image, the method comprising:

embedding a digital watermark data in the original image, wherein the original image is divided into a plurality of blocks each block having been embedded with a pattern corresponding to each value of the digital watermark data;

storing, in a memory, the original image, the digital watermark data embedded in the original image, and an embedding position of the pattern of the digital watermark data in association with each other;

detecting a pattern in a scanned image of the printed matter;

decoding the detected pattern to acquire digital watermark data included in the scanned image;

aligning each block between the original image and the scanned image, based on the embedding position of the pattern associated with the original image and a detection position of the pattern detected from the scanned image; and obtaining a difference between the original image and the scanned image aligned with each other to detect an alteration of the printed matter.

\* \* \* \* \*